(12) United States Patent
Le Pennec et al.

(10) Patent No.: US 6,771,653 B1
(45) Date of Patent: Aug. 3, 2004

(54) PRIORITY QUEUE MANAGEMENT SYSTEM FOR THE TRANSMISSION OF DATA FRAMES FROM A NODE IN A NETWORK NODE

(75) Inventors: Jean-Francois Le Pennec, Nice (FR); Jacques Fieschi, Saint Laurent du Var (FR); Aline Fichou, La Colle sur Loup (FR); Claude Galand, La Colle/Loup (FR)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 09/664,696

(22) Filed: Sep. 19, 2000

(30) Foreign Application Priority Data

Sep. 23, 1999 (EP) ............................................ 99480087

(51) Int. Cl.[7] ............................................. H04L 12/54
(52) U.S. Cl. ........................ 370/412; 370/419; 370/428
(58) Field of Search ................................. 370/230–235, 370/412–421, 428, 429

(56) References Cited

U.S. PATENT DOCUMENTS

| | | | | |
|---|---|---|---|---|
| 4,965,716 A | * | 10/1990 | Sweeney ..................... | 710/112 |
| 5,487,061 A | * | 1/1996 | Bray .......................... | 370/252 |
| 5,553,061 A | * | 9/1996 | Waggener, Jr. et al. ..  | 250/491.1 |
| 6,407,999 B1 | * | 6/2002 | Olkkonen et al. .......... | 370/389 |
| 6,434,145 B1 | * | 8/2002 | Opsasnick et al. ......... | 370/394 |
| 6,661,802 B1 | * | 12/2003 | Homberg et al. ........... | 370/412 |

* cited by examiner

*Primary Examiner*—Steven H. D Nguyen
*Assistant Examiner*—Roberta Stevens
(74) *Attorney, Agent, or Firm*—Daniel E. McConnell; Dillon & Yudell LLP (57) ABSTRACT

A system for providing prioritized queue management within a data transmission network node that supports different types of data frame traffic is disclosed herein. The system includes a frame buffer for storing an incoming frame that has an identifiable frame type. A queue is pre-associated with the frame type of the incoming frame such that upon arrival of the frame at the network node, the queue stores a location address at which the frame is stored within the frame buffer such that the frame is maintained within the queue. The queue that contains the frame is stored within a frame table. Processing means are provided for determining a time at which the queue forwards the frame from the frame buffer in accordance with a pre-determined sub-queue priority list. The system further includes time metering means associated with the frame for temporally assigning the frame to a virtual sub-queue among multiple virtual sub-queues that are associated with the queue. The sub-queues are sequentially ordered according to the predetermined sub-queue priority list such that the processing means selects a highest priority frame for forwarding from the frame buffer.

10 Claims, 6 Drawing Sheets

FIG. 1

| QUEUE ID | TIMER GREEN | TIMER AMBER | SQID | FLOW ID | POS | D | FRAME BUFFER |
|---|---|---|---|---|---|---|---|
|  |  |  |  |  |  |  |  |

FRAME TABLE

FIG. 2

| P | SQN | MASK |
|---|---|---|
|  |  |  |

PRIORITY TABLE

INTWORD

| J | QDID | DISCARD ACTION |
|---|------|----------------|
|   |      |                |
|   |      |                |

DELETION TABLE

PRIORITY QUEUE MANAGEMENT SYSTEM FOR THE TRANSMISSION OF DATA FRAMES FROM A NODE IN A NETWORK NODE

BACKGROUND OF THE INVENTION

1. Technical Field

The present invention relates to data transmission networks wherein each node within a network transmits data frames to other nodes in accordance with a designated priority and the type of data contained therein. In particular, the present invention relates to a prioritized queue management system within a data transmission network.

2. Background

A data transmission network is generally a multi-service network carrying differing types of traffic between various applications. Some traffic is critical but some is not and may have a major and unintended impact on overall network performance. A user may, for example, disrupt critical transaction traffic by sending a large document or presentation files to one or several remote users. A structural or operative network change or failure may also impact traffic flow. Without a network traffic prioritization scheme, important data transactions may be heavily impacted.

Applications that utilize a network create three different categories of traffic. These traffic categories are differentiated by their latency (network delay) requirements. Real-time traffic (RT) such as conversational voice, video conferencing, and real-time multimedia, requires a very low latency and controlled latency variation (jitter). Compressed traffic is sensitive to transmission errors, but, because of its low latency requirements, errors in transmission cannot be overcome by retransmission. Therefore, transmission of compressed traffic must have low error rates, or forward-error-correction must be utilized. Both low latency and forward-error-correction decrease the effective transmission rate of a compressed transmission.

Interactive traffic, such as transaction processing, remote data entry, and some legacy protocols (e.g., SNA) requires latencies of approximately one second or less. Greater latencies cause processing delays as the users must wait for replies to their messages before they can continue their work. In some cases, such as certain legacy protocols, exceeding the allowable latency causes session failure; the applications must then re-establish the session. Interactive traffic is not sensitive to bandwidth beyond that needed to satisfy its latency requirements.

Bulk transfer traffic, also called Non Real Time (NRT) accepts virtually any network latency, including latencies on the order of a few seconds. Bulk transfer traffic is more sensitive to the available bandwidth than to the latency. An unusual application of bulk transfer is for transmitting video and audio data that is processed and presented to the end user while the file is still arriving.

Within each traffic category, traffic may be further subdivided by priority. Priorities are not substitutes for traffic categories, which are absolute, not relative, requirements. High priority traffic receives preferential treatment because of its importance to the enterprise, unlike a traffic category which supports an application that will fail if sufficient communications service is not provided. As there are no absolute network parameters that are universally associated with a priority, the meaning, in terms of measurable network performance, of a particular priority varies from one network to the next.

Another priority classification differentiates between Reserved Traffic and Non Reserved traffic. The need for this prioritization arises when both types may coexist in the same network. When data traffic is designated as "reserved", its characteristics are known and accepted throughout the network. Reserved traffic is transported at a higher priority than non-reserved traffic.

The priority assigned to reserved traffic is an absolute priority, while the priority of all non reserved flows is relative. Absolute priority means that a traffic engineering mechanism has validated that the requesting traffic may pass through the network. The traffic engineering mechanism provides a network context in which reserved traffic is transported with pre-defined (requested) characteristics. For traffic having a relative priority, a priority level is assigned as the traffic enters a node.

Quality of service (QoS) technology provides a method for categorizing traffic and for ensuring that particular categories of traffic will either flow across a backbone in a timely manner, or at least will be prioritized, regardless of competing demands. The primary role of QoS technology is to protect mission-critical traffic from interference by less important traffic. A secondary role of QoS is to allow other non-critical traffic to be transported in a fair and efficient manner. For example, QoS technology permits new multimedia applications to be delivered with a guaranteed delay (latency) and throughput (bandwidth) while observing the critical/non critical distinction.

Current QoS techniques rely on queuing algorithms of various type implemented in network routers and other network devices. Utilization of queues in routers has emerged as a way to handle the problem of bursty Internet Protocol (IP) traffic. As traffic arrives at a router, it is placed in one of a number of queues that are associated with the correct outgoing router port. Depending on the particular queuing algorithm selected during router configuration, traffic is then taken from the queues for transmission. However, two major problems arise from queuing: high-priority interactive traffic can be easily blocked behind bulk data transfers, and queue overflows can-cause packet loss in all traffic, not just the one that saturated the queue.

Priority queuing was developed to overcome the first major problem. It maintains separate outgoing queues for different traffic classes on the same outgoing port. A frame cannot be transmitted from a queue unless all of the higher-priority queues are empty. The drawback of priority queuing is that lower priority queues can be starved for capacity when a link is overloaded. This low priority queue starvation worsens the overload problem by driving low priority traffic flows into timeout and into attempted retransmissions.

Priority queuing has been improved by methods such as Fair Queing (FQ) which attempts to ensure that all queues receive a designated share of the bandwidth. However, this method is not dynamic, nor does it differentiate among differing types of incoming traffic, resulting in limiting some queues permanently. Another method, Weighted Fair Queuing (WFQ), further separates each priority into high and low bandwidth flows. Low bandwidth flows are given priority over high bandwidth flows with traffic flows within groups being interleaved. Response times for the low bandwidth flows (real-time or interactive traffic) are greatly improved and bursty traffic in all flows is interleaved. Nevertheless, a drawback remains in that multiple low bandwidth flows may penalize or even jeopardize high bandwith traffic. Furthermore, WFQ does not account for jitter.

None of the above-mentioned methods directly reduces the overflow problem, resulting in waves of bursty traffic and buffer overflows. The Random Early Detection (RED) algorithm addresses this issue. Instead of allowing "tail drop" to occur, RED monitors outgoing queue size and drops a frame in selected traffic flows before the queue overflows. This frame "loss" causes congestion in the involved flow process and temporarily decreases the flow rate. Other frames belonging to such a flow may be needlessly transmitted as they will be discarded anyway and retransmitted. Unfortunately, retransmission or "window restart" may increase the congestion problem as all the frames within a window will be retransmitted on all flows.

SUMMARY OF THE INVENTION

A system for providing prioritized queue management within a data transmission network node that supports different types of data frame traffic is disclosed herein. The system includes a frame buffer for storing an incoming frame that has an identifiable frame type. A queue is pre-associated with the frame type of the incoming frame such that upon arrival of the frame at the network node, the queue stores a location address at which the frame is stored within the frame buffer such that the frame is maintained within the queue. The queue that contains the frame is stored within a frame table. Processing means are provided for determining a time at which the queue forwards the frame from the frame buffer in accordance with a pre-determined sub-queue priority list. The system further includes time metering means associated with the frame for temporally assigning the frame to a virtual sub-queue among multiple virtual sub-queues that are associated with the queue. The sub-queues are sequentially ordered according to the predetermined sub-queue priority list such that the processing means selects a highest priority frame for forwarding from the frame buffer.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE PREFERRED EMBODIMENT

Figure 1:
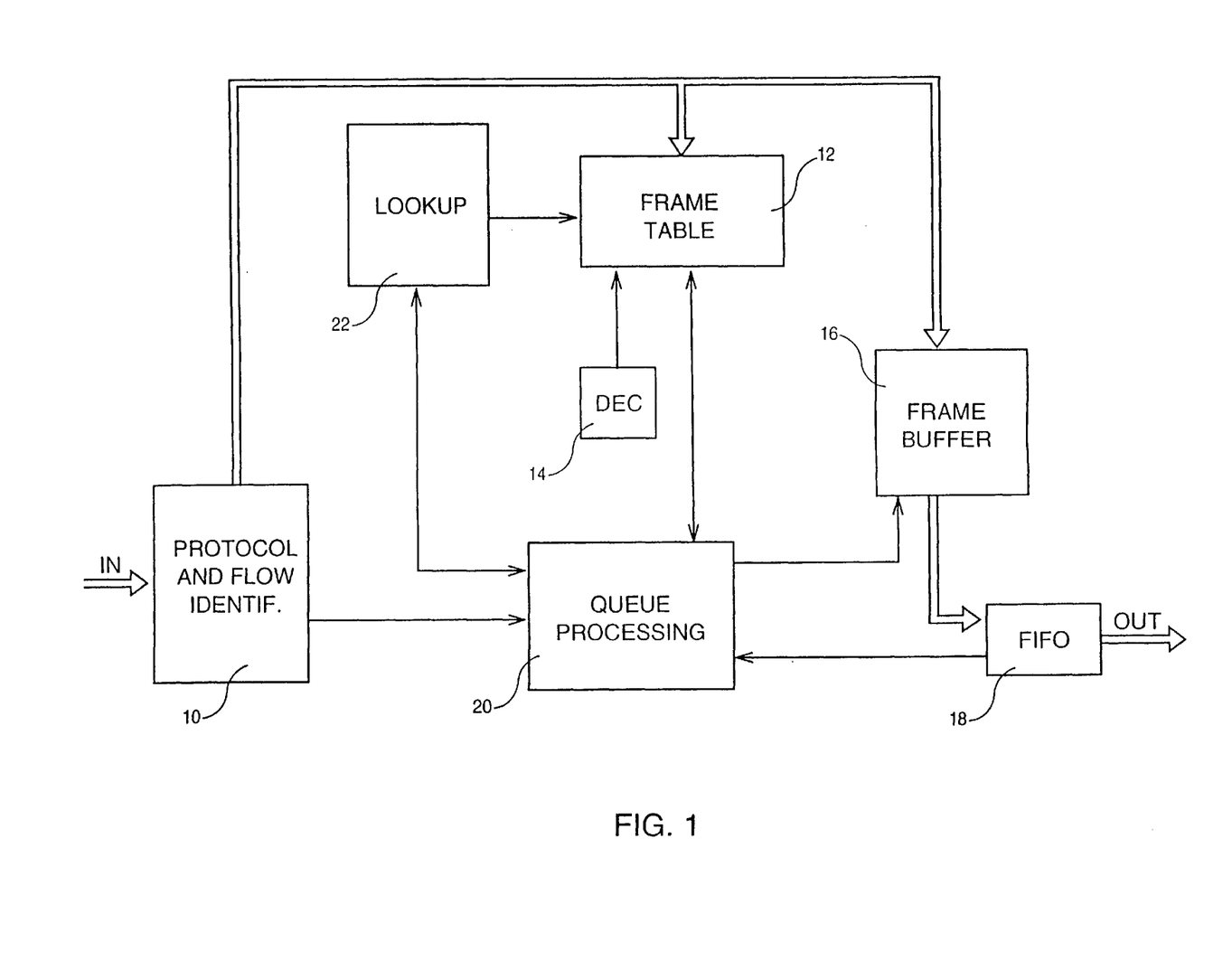
FIG. 1 is a schematic block-diagram depicting a queue management system according to a preferred embodiment of the present invention.

With reference to FIG. 1, the queue management system according to the invention includes a Protocol and Flow Identification unit 10 for identifying the data flow to which belongs the frame received as input. This can be done by simply determining the flow ID or by identifying the frame protocol.

Figure 2:
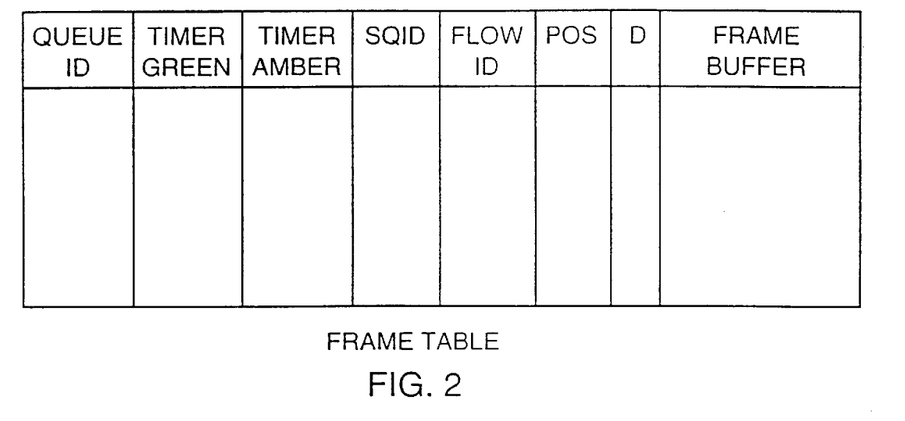
FIG. 2 illustrates a frame table included in the queue management system depicted in FIG. 1.

Parameters so determined are put into a Frame Table 12 that is utilized to identify frames received as input. It should be noted that all frames that belong to a given flow have the same classification.

Parameters put into Frame Table 12 depicted in FIG. 2 are first the queue identification (Queue ID) that contains the frame. As such, eight queues can be utilized, four of which being dedicated to the reserved traffic and the remaining four for the non-reserved traffic. Within each of these two types of traffic, the four queues can be ordered according to the following order depending on whether data is Real-Time data (RT) or non Real-Time data (NRT):

1. RT non discardable
2. RT discardable (voice)
3. NRT delay sensitive (interactive traffic)
4. NRT non delay sensitive (file transfer)

The Frame table also has two fields, Timer Green and Timer Amber, which are initialized with predetermined values. The Timer value in Timer Green is immediately decremented by a decrement unit 14. When the Timer Green field reaches the value 0, the decrement unit 14 starts decrementing the value in Timer Amber. As a result, for each queue determined by Queue ID, three sub-queues exist. The frame will be said to be in green sub-queue as long as the value in the Timer Green field is not 0. Then the frame passes in amber queue until the value in Timer Amber is 0. Finally, when values in both Timer Green and Timer Amber fields have been decremented to 0, the frame is then in the red sub-queue and, depending on its priority level, this frame may require urgent forwarding (by using an interrupt).

The system according to the invention includes a Queue Processing unit 20, for example a microprocessor, that keeps up to date a SQID field of Frame Table 12 that contains the identifier of the virtual sub-queue in which the frame is placed. In this manner, when the frame arrives, SQID contains the number of the green sub-queue associated with the queue identified by the "Queue ID" field. Then, when the value in the "Timer Green" field reaches 0, the field value changes to contain the amber sub-queue number associated with "Queue ID". Finally, when the value the Timer Amber field reaches 0, SQID is set to the red sub-queue identifier associated with "Queue ID".

It should be noted that passing from the green sub-queue to the amber sub-queue and then to the red sub-queue essentially defines two time thresholds. Therefore, both fields, Timer Green and Timer Amber, could be replaced with a timer, the output value of which would be continuously compared with the two threshold values to determine in which sub-queue (Green, Amber, or Red) the frame is located at a given time.

While each queue has three sub-queues (Green, Amber, or Red) in the example given in the description, it is possible to define a plurality K of sub-queues, the number of which is any other number than three without being outside the scope of the invention. In such a case, each frame is defined within the table by K–1 fields successively decremented by the decrement unit 14, starting with the field associated with the sub-queue having the lowest priority level, a field being decremented only when the previous field value has reached 0.

The other fields of the Frame Table include "Flow ID" for identifying the data flow to which the frame belongs, "Pos" that indicates the frame position within the flow and thus prevents forwarding a frame before an older frame belonging to the same flow. Be that as it may, the preferred embodiment consists in re-ordering the table whenever a frame is forwarded, that is performing a translation of all the frames located downstream in order to fill the location left empty further to frame forwarding.

Finally, the Frame Table contains the location address of a Frame Buffer 16 in which the frame is stored, and a one-bit field indicating the frame discardability. The field D can be set to 1 for all the frames in a few flows (low priority file transfers) or, for example, for a few frames in a flow for a voice frame.

When at least one frame is stored in the Frame Buffer 16 and FIFO 18 is ready to accept a new frame to forward it as output, the Queue Processing unit 20 orders search an operation for the frame to be forwarded to a Lookup unit 22 according to a procedure described below. It should be noted that the size of FIFO 18 could be relatively small and could correspond to the time required to identify the next frame to be forwarded.

Thus, as shown by the example given in the description, it can be seen that every frame is placed in one of eight queues depending on its original features (such as <<Reserved>> or <<Non-Reserved>> or <<Real-Time>> or <<Non-Real-Time>>) but is also virtually placed in one of three sub-queues depending on how much time has been elapsed since it was received as input. In this manner, any frame located in the buffer memory 16 is associated, at a given time, with a sub-queue among 8×3=24 virtual sub-queues. It should be noted that a number of queues Q with each queue including K sub-queues each could give a total number of virtual sub-queues equal to Q.K.

An essential feature of the invention is establish a priority list containing the precedence order assigned to each virtual sub-queue. This list takes into account, on the one hand, the predefined precedence order of queues in relation with all others and, on the other hand, the precedence order (resulting from the standby time of frames in the buffer memory) of sub-queues in relation with all others. This list is determined in the priority table which is shown schematically in FIG. 3. Each precedence order number P (P ranging from 1 through M), corresponds in the table to the identifier of the associated virtual sub-queue SQN (Sub-queue N) and to a MASK bit that can be set to 1 to indicate that the transfer process of the frames identified in sequence in Frame Table 12 cannot be stopped despite the presence in the buffer memory of frames associated with sub-queues having a very high priority level.

Figure 4:
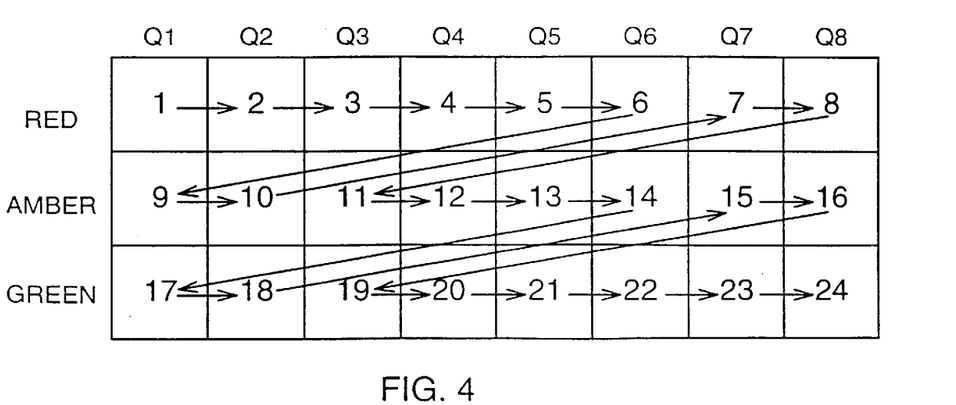
FIG. 4 is a diagram representing schematically the priority list of the sub-queues utilized in the examples given for illustrating the invention.

While still considering the example of eight queues each provided with three sub-queues, the priority list in the priority table is illustrated by the diagram in FIG. 4, in which each column Qi represents one of the eight queues and each row represents one of the virtual sub-queues (Green, Amber, and Red). Given the precedence order determined by the arrows (given only as an example) and assuming that only three sub-queues cannot be stopped, the priority table is as follows.

As previously seen, one of the essential principles of the invention is to place the frames in sub-queues whose "color" changes as their storage time increases. In this manner, as in the example described, the sub-queue is first green, then amber and finally red. A feature of the invention consists in considering that the frames in a red sub-queue have reached a critical point and that they must be forwarded as a priority. This is why an interrupt mechanism is designed to be triggered by any frame located in a red sub-queue, either when it is placed in it, or after some predetermined time set by a timer. To this end, there is an INTWORD registry shown in FIG. 5, the positions of which correspond to the list P' of red sub-queues precedence numbers (P) in the priority list contained in the priority table shown in FIG. 3. In this manner, in the example utilized, the list P' is as follows:

P'=1 2 3 4 5 6 9 10

Figure 5:
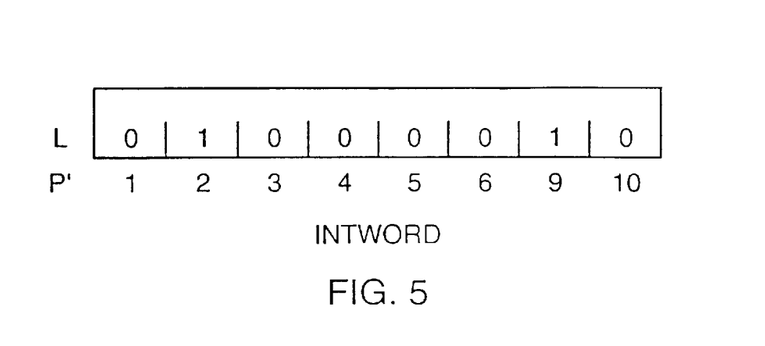
FIG. 5 represents the contents of register INTWORD for the example given for illustrating the invention.

Referring to FIG. 5, the L positions of INTWORD register that correspond to sub-queues containing frames for a predetermined time, are set to 1 while the other positions are set to 0. Here, only positions P'=2 and P'=9 have been set to 1.

Figure 3:
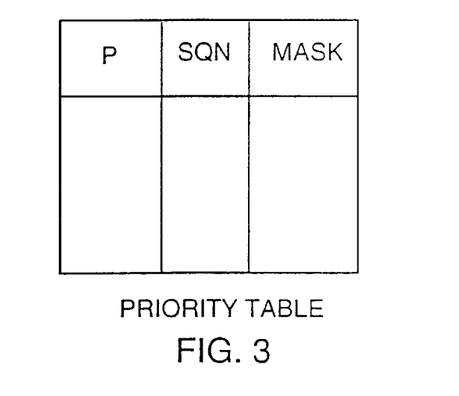
FIG. 3 depicts a priority table utilized by the queue management system shown in FIG. 1 for determining the priority list of the sub-queues that are associated with the frames to be transmitted.

| P    | 1 | 2 | 3 | 4 | 5 | 6 | 7  | 8  | 9 | 10 | 11 | 12 | 13 | 14 | 15 | 16 | 17 | 18 | 19 | 20 | 21 | 22 | 23 | 24 |
|------|---|---|---|---|---|---|----|----|---|----|----|----|----|----|----|----|----|----|----|----|----|----|----|----|
| SQN  | 1 | 2 | 3 | 4 | 5 | 6 | 9  | 10 | 7 | 8  | 11 | 12 | 13 | 14 | 17 | 18 | 15 | 16 | 19 | 20 | 21 | 22 | 23 | 24 |
| MASK | 1 | 1 | 0 | 0 | 1 | 0 | 0  | 0  | 0 | 0  | 0  | 0  | 0  | 0  | 0  | 0  | 0  | 0  | 0  | 0  | 0  | 0  | 0  | 0  |

Figure 6:
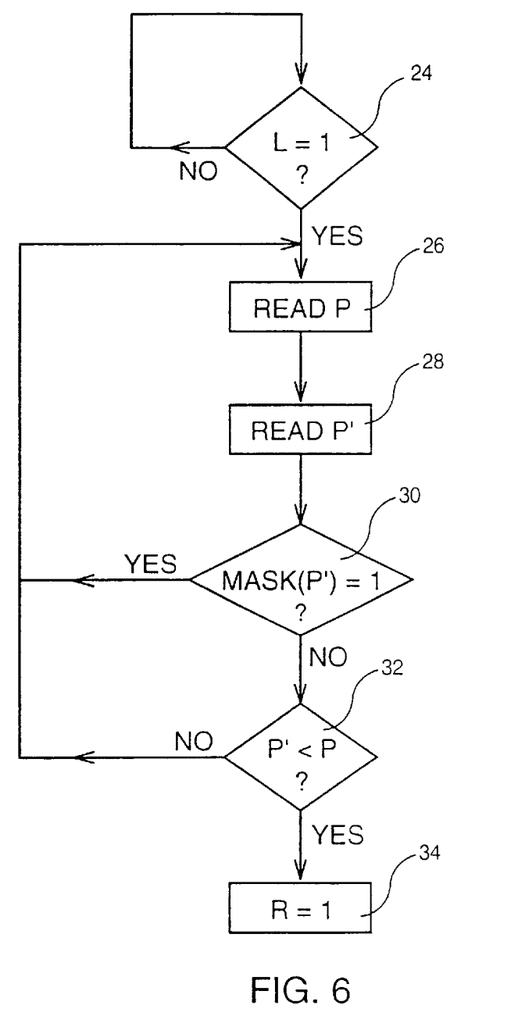
FIG. 6 represents a flow-chart of the interrupt triggering process utilized in the queue management system according to the invention.

The interrupt triggering process is shown on FIG. 6. First, a loop determines whether at least one bit L is set to 1 in the register INTWORD (step 24). If so, the Queue Processing unit reads the current value of P (step 26), and then it reads the P' value corresponding to the first bit from the left set to 1 in the INTWORD register (step 28). A test determines whether the MASK bit value corresponding to P' in the priority table, FIG. 3, is set to 1 (step 30). If so, this means that the corresponding sub-queue cannot be stopped and the process loops again at step 26. If the MASK bit value is set to 0, an interrupt can thus occur. In such a case, one checks whether P' is lower than P (step 32). If not, there is no need to perform an interrupt since, as will be described below, the sub-queue corresponding to P will be processed soon. In that case, the process loops again too at step 26. If, on the other hand, P' is lower than P, a bit R is set to 1 (step 34) to indicate that the sub-queue corresponding to P' must be processed as a priority.

Figure 7:
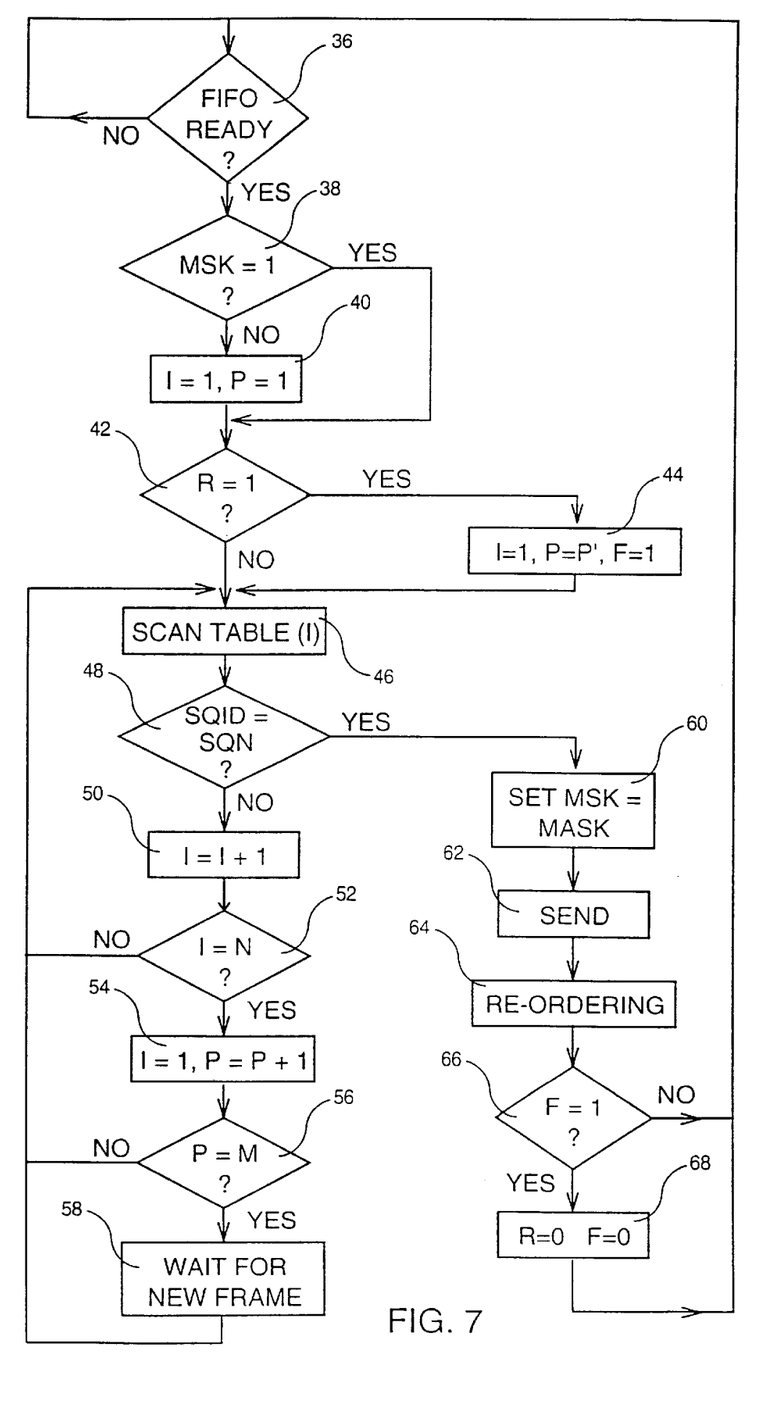
FIG. 7 represents a flow-chart of the frame forwarding process utilized in the queue management system according to the invention.

Processing for frame forwarding is carried out according to the process shown by the flow-chart in FIG. 7. This process starts only if FIFO 18 is ready to forward a new frame (step 36). If so, one checks whether a MSK bit is set to 1 (step 38), this bit indicating whether the current MASK bit in the priority table is set to 1, as will be described below. If the MSK bit is set to 0, which indicates that the process runs sequentially, the Frame table addressing value I is set to 1, thus pointing to the first address in the table, and the value P of the priority list is also set to 1 to indicate that frames having the highest priority level must be processed (step 40). On the other hand, when the MSK bit is set to 1, variables I and P are not reset to 1.

A test is then carried out to determine whether the bit R resulting from the flow chart in FIG. 6 is set to 1 (step 42). If so, the table addressing value I is set to 1, if not set previously, the value P is set to P' and a flag F is set to 1 (step 44). The presence of R=1 indicates in fact that an interrupt caused by a sub-queue P' has occurred and that the Frame table must be swept from the beginning to process frames that belong to this sub-queue.

Regardless of the value of R, the Frame Table is read at address I, starting with I=1 (step 46). A test is then carried out to determine whether the SQID value of the frame located at address I in the Frame Table is equal to the SQN value in the Priority Table (step 48). If not, the address I in the Frame Table is incremented to I+1 (step 50) and a test is carried out to determine whether table sweeping is complete, that is whether I=N (step 52). If not, the table is addressed again to the next location and the process is repeated. When the value I reaches the upper limit N, I is set to 1 and the priority P is incremented to P+1 (step 54). A test is then carried out to know whether the priority list has been swept to the end, that is for P=M (step 56). If not, the Frame Table sweeping process is performed again from step 46. If, on the other hand, P=M, this means that there are no more frames to be processed and the system then enters a stage in which it waits for a new frame (step 58) before looping to Frame Table sweeping at step 46.

If, at step 48, the condition SQID=SQN is true, which indicates that the Frame Table addressing value I points to a frame associated with a sub-queue corresponding to the sub-queue associated with current priority P in the priority table, the MSK bit is set to the MASK value located in priority table at current priority P (step 60). Then, the frame is transferred from FRAME Buffer 16 to FIFO 18 to be forwarded as output (62), and a Frame Table re-ordering procedure is performed (step 64). It should be noted that setting the MSK bit to the MASK value corresponding to the sub-queue currently processed enables to determine, at step 38, whether the current sub-queue processing must be continued even if there are sub-queues with a higher priority level at locations in the Frame Table with lower addresses I.

Once the frame has been forwarded and the Frame Table has been re-ordered, a test is carried out to determine the value of flag F (step 66). If F=1, R bit and F bit are both reset to 0 (step 68). In both cases, the process loops back to the beginning, waiting for FIFO ready (step 36).

At this stage, it is worth mentioning another important feature of the invention which consists in drawing up a deletion list to be utilized when congestion occurs due to the fact that the Frame Buffer is full or a frame placed in a red sub-queue was not served within a predetermined period of time.

The deletion list determines the order, ranging from 1 through M, of sub-queues for which it is authorized to delete the frames contained in it when the congestion problem occurs. This list is given by a deletion table shown in FIG. 8. For each value J there is a corresponding QDID identification of the sub-queue associated with this level and a field "Discard Action" that gives indications on the frames that can be deleted: one frame only, multiple frames, all the frames in a given flow in that subqueue or all the frames in a given flow in the queue (all 3 sub-queues)to which the sub-queue belongs.

Figure 8:
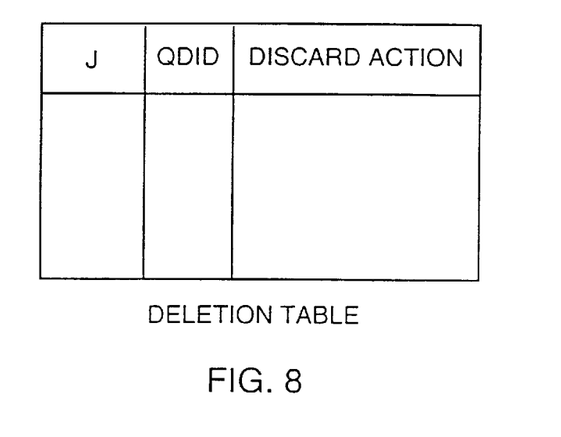
FIG. 8 is a diagram representing schematically the deletion table utilized by the queue management system to determine the deletion list of the sub-queues to which are associated the frames to be deleted.
Figure 9:
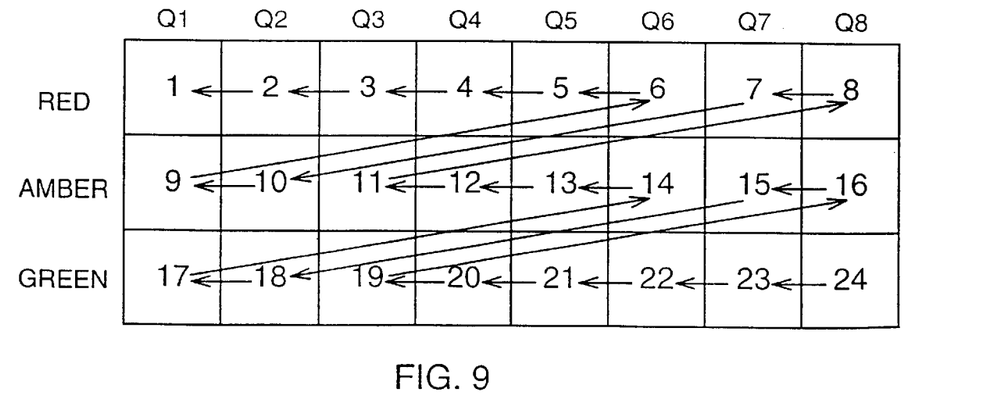
FIG. 9 is a diagram representing schematically the deletion list of the sub-queues utilized in the example given for illustrating the invention.

Still considering the example of eight queues provided each with three sub-queues, the deletion list in the deletion table is depicted in the diagram of FIG. 9 in which each column Qi represents one of the eight queues and each row represents one of the virtual sub-queues (Green, Amber, Red). The deletion order indicated by the arrows has been chosen as the reverse order of the priority list shown in FIG. 4. As such, the deletion table appears as follows:

| J | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| QDID | 24 | 23 | 22 | 21 | 20 | 19 | 16 | 15 | 18 | 17 | 14 | 13 | 12 | 11 | 8 | 7 | 10 | 9 | 6 | 5 | 4 | 3 | 2 | 1 |

Figure 10:
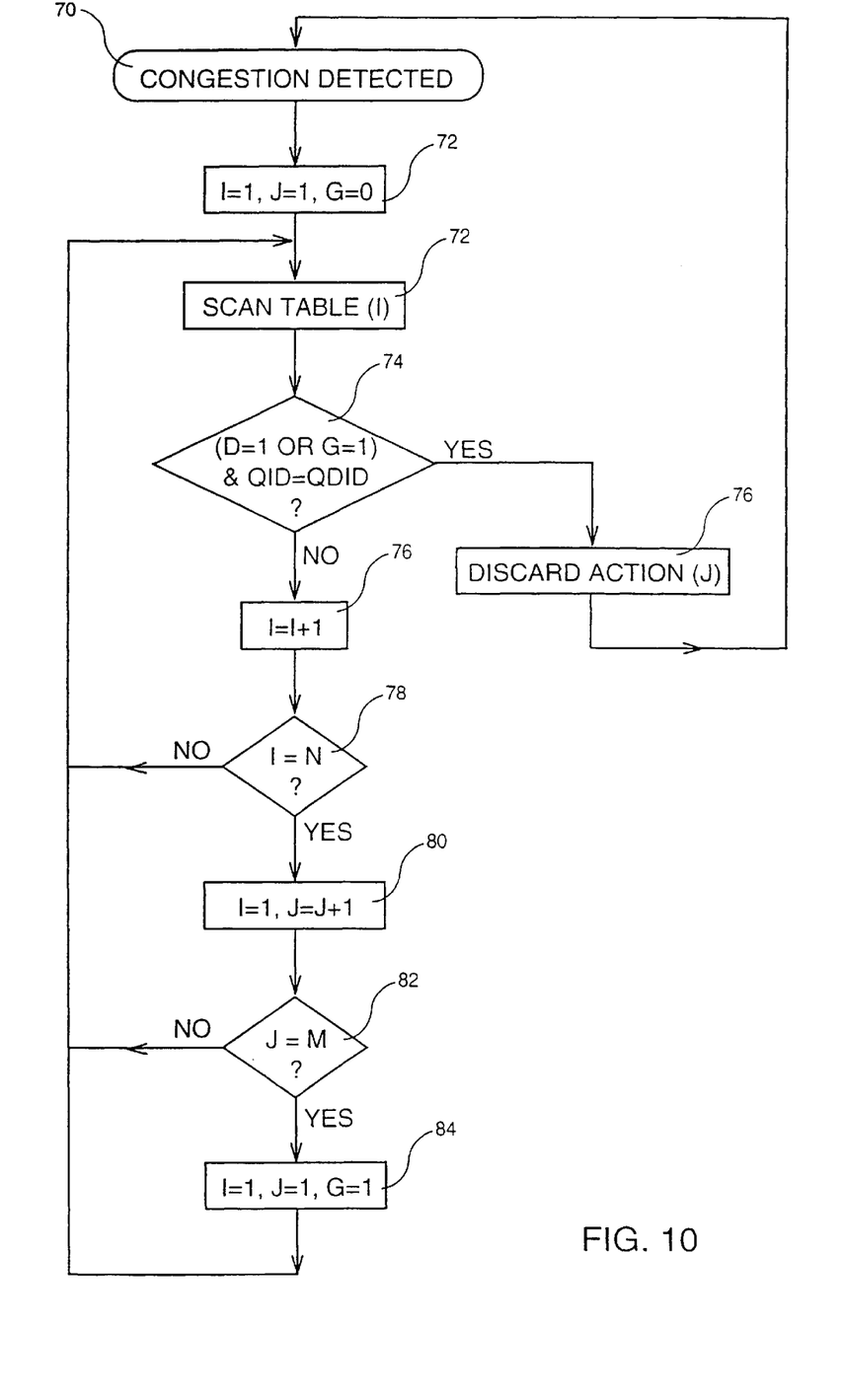
FIG. 10 represents a flow-chart of the frame deletion process utilized in the queue management system according to the invention.

Frame deletion is carried out according to the process represented by the flow-chart in FIG. 10. This process starts when a congestion problem is detected (step 70). At this time, the Frame Table addressing index I, and the index J that determines the current position within the deletion table are set to 1 and a flag G is set to 0 (step 72). Then, the Frame Table is addressed, starting with the address I=1 (step 72). A test (step 74) is then performed to determine whether the two conditions are both met, the first condition being that either the discardability bit D or the flag G is set to 1, and the second condition being that the current sub-queue corresponding to the location in Frame Table just addressed corresponds to the QDID sub-queue defined by the index J in the deletion table. If these two conditions are met, a Discard Action is performed on the corresponding frame (step 76). Then, the process loops again at step 70, waiting for new congestion.

If the two conditions described above are not met, the Frame Table addressing index I is incremented to I+1 and a test is carried out to determine whether I has reached its maximum value (step 78). If not, the Frame Table sweeping process continues at step 72. If so, I is set to 1 and the deletion table index J is incremented to J+1 (step 80) in order to proceed with the next sub-queue according to the order set out in the deletion table. A test is then carried out (step 82) to determine whether the index J has reached its maximum value J=M (24 in the example described). If not, the Frame Table sweeping process is resumed for the new value of J at step 72. If, on the other hand, J has reached its maximum value, indexes I and J are set to 1 as well as flag G (step 84) and the sweeping process starts again at step 72.

It will be noted that, as flag G is first set to 0, the discardability bit D must be set to 1 in the Frame Table so that the frame being examined can be deleted. But after the frames that meet these conditions have been deleted, the presence of flag G set to 1 enables to delete other frames for which D is equal to 0 when it is essential to delete frames inview of the congestion.

What is claimed is:

1. A system for providing prioritized queue management within a data transmission network node, wherein said data transmission network node supports different types of data frame traffic, said system comprising:

a frame buffer for storing an incoming frame that has an identifiable frame type;

a queue pre-associated with said frame type such that upon said frame arriving at said network node said queue stores a location address at which said frame is stored within said frame buffer such that said frame is maintained within said queue;

a frame table for containing said queue;

processing means for determining a time at which said queue forwards said frame from said frame buffer in accordance with a pre-determined sub-queue priority list;

time metering means associated with said frame within said frame table for temporally assigning said frame to a virtual sub-queue among a plurality of K virtual sub-queues that are associated with said queue, wherein said sub-queues are sequentially ordered according to said predetermined sub-queue priority list such that said processing means selects a highest priority frame for forwarding from said frame buffer; and an interrupt register with positions corresponding to priority list positions that are associated with each sub-queue which contain frames having a longest storage time, wherein said priority list positions are switched from a logic 0 to a logic 1 in response to said storage time of a frame exceeds a predetermined value, such that said system is prevented from disabling forwarding of said frame.

2. The system of claim 1, wherein said K virtual sub-queues further includes K sub-queues having less than a highest priority and a highest priority sub-queue, wherein said time metering means further includes a plurality of timer fields within said frame table associated with said K-i sub-queues, wherein each of said timer fields is initialized to a predetermined timer value; and a decrement unit for successively decrementing said timer values contained in each of said timer fields starting with a timer field associated with a sub-queue having a lowest priority level, wherein said timer field is decremented only in response to the previous timer field reaching a value of 0, and wherein said frame is virtually placed in a sub-queue associated with a timer field that gives rise to decrementation.

3. The system of claim 2, wherein said frame table further includes a sub-queue field for identifying a sub-queue in which said frame is placed; and processing means for modifying said sub-queue field whenever a timer value associated with said sub-queue decrements to a value of 0 such that a next sub-queue, in which said frame is subsequently placed, is identified within said frame table.

4. The system of claim 1, wherein said sub-queue priority list is stored within a priority table in which, for each priority level, a mask bit is set to a logical 1 when a sub-queue is defined as a sub-queue having processing that cannot be stopped by another sub-queue.

5. The system of claim 1, wherein said frame buffer further includes data storage means for storing frames received at an input of said network node; and data processing means for transferring said frames to a first-in-first-out output that forwards said frames as output under the control of said processing means.

6. The system of claim 5, wherein said system further includes processing means for re-ordering said frame table in response to a frame being forwarded as output from said frame buffer, such that a table entry location within said frame table previously occupied by said frame is forwarded within said frame table to receive subsequently arriving frames.

7. The system of claim 1, wherein said processing means further includes processing means for comparing a priority list position P' whose corresponding bit from said interrupt register is set to a logic 1 at position P within said priority list such that said frame is forwarded only if said position P' corresponds to a higher priority level than said position P.

8. The system of claim 1, wherein said system further includes a deletion table having an index that identifies a sub-queue, wherein said index is associated with one or more frames that are discarded in accordance with a sequential order determined by said index if a congestion problem occurs.

9. The system of claim 8, wherein said deletion table further includes a discard action field that specifies whether one or more frames will be discarded in response to a congestion problem.

10. The system of claim 9, wherein each entry within said frame table includes a discardibility bit associated with each frame, wherein said discardibility bit indicates a priority level of a frames to be discarded.

* * * * *